United States Patent [19]
Halter

[11] Patent Number: 5,905,895
[45] Date of Patent: May 18, 1999

[54] METHOD AND SYSTEM FOR OPTIMIZING NON-NATIVE BYTECODES BEFORE BYTECODE INTERPRETATION

[75] Inventor: Steven Lester Halter, Rochester, Minn.

[73] Assignee: International Business Machines Corporation, Armonk, N.Y.

[21] Appl. No.: 08/814,175

[22] Filed: Mar. 7, 1997

[51] Int. Cl.$^6$ .................................................. C01B 33/36
[52] U.S. Cl. .......................... 395/709; 395/701; 395/702; 395/704; 395/183.14; 364/400
[58] Field of Search ..................... 395/701, 705, 395/702, 704, 183.14, 182.06; 364/400; 380/4; 707/100

[56] References Cited

U.S. PATENT DOCUMENTS

| | | | |
|---|---|---|---|
| 4,769,767 | 9/1988 | Hilbrink | 395/182.06 |
| 5,668,999 | 9/1997 | Gosling | 395/704 |
| 5,692,047 | 11/1997 | McManis | 380/4 |
| 5,740,441 | 4/1998 | Yellin et al. | 395/704 |
| 5,768,593 | 6/1998 | Walters et al. | 395/705 |
| 5,784,553 | 7/1998 | Kolawa et al. | 395/183.14 |

OTHER PUBLICATIONS

Heieh, Gyllenhaal & Hwu, Java bytecode to native code translation: The caffeine prototype and preliminary results, IEEE, pp. 90–97, 1996.

Stata & Abadi, A type system for Java bytecode Subroutines, ACM POPL 98, 1998.

*Primary Examiner*—Tariq R. Hafiz
*Assistant Examiner*—Anil Khatri
*Attorney, Agent, or Firm*—Antony P. Ng; Andrew J. Dillon

[57] ABSTRACT

A method and system for optimizing Java bytecodes before bytecode interpretation within a computer system is disclosed. In accordance with the method and system of the present invention, a first bytecode and a second bytecode are first obtained from a file. Both the first bytecode and the second bytecode are results of a compilation of a high-level computer program. A set of instructions native to a processor within the computer system can be formed by compiling these first bytecode and second bytecode. An optimizable bytecode table is provided, and the optimizable bytecode table includes a multiple of bytecode-pair entries and a corresponding optimized bytecode. A determination is made as to whether or not the first bytecode and the second bytecode are optimizable by comparing the first bytecode and the second bytecode with all the bytecode-pair entries within the optimizable bytecode table. In response to a determination that the first bytecode and the second bytecode match one of the bytecode-pair entries within the optimizable bytecode table, the first bytecode and the second bytecode are replaced with a corresponding optimized bytecode from the optimizable bytecode table.

11 Claims, 2 Drawing Sheets

METHOD AND SYSTEM FOR OPTIMIZING NON-NATIVE BYTECODES BEFORE BYTECODE INTERPRETATION

BACKGROUND OF THE INVENTION

1. Technical Field

The present invention relates to a method and system for data processing in general and, in particular, to a method and system for processing non-native bytecodes within a computer system. Still more particularly, the present invention relates to a method and system for optimizing non-native bytecodes before bytecode interpretation within a computer system.

2. Description of the Prior Art

The World Wide Web, or as it is simply known, the "Web," has dramatically changed the online world and continues to grow in popularity. As a communication system, the Web allows information providers to distribute and collect information globally and instantly. For users, the Web is a dynamic view into the works and ideas of millions of people worldwide. Through a system of hypertext, users of the Web are able to select and view information from all over the Web.

While the hypertext system gives Web users a high degree of selectivity over the information they choose to view, their level of interactivity with that information is low. Even with improvements such as hypermedia, which opens up many new kinds of sensory input for the Web users, including access to text, graphics, or videos, the Web itself still lacks a true interactivity-the kind of real-time, dynamic, and visual interaction between the Web users and the application.

Java[1] brings this missing interactivity to the Web. With Java, animations and interactive applications on the Web become feasible. Java's features enrich communication, information, and interaction on the Web by enabling the distribution of executable content-rather than just Hypertext Markup Language (HTML) pages and hypermedia files-among Web users. This ability to distribute executable content is one of the powerful features of Java.

[1]Java is a trademark of Sun Microsystems, and is also the name of the programming language developed by Sun Microsystems.

An application software written in Java is first compiled into a set of Java bytecodes. The Java bytecodes are subsequently distributed to a software user through the Web. In order to utilize the application software, to view and interact with an animation or interactive application, a Web user must have a computer having a Java-enabled Web browser installed. A Java-enabled Web browser has a built-in Java interpreter such that the Java bytecodes can be interpreted and executed within the Web user's computer. Although the speed of this Java interpretation procedure is typically quite fast, the performance could be enhanced if the Java bytecodes can be optimized before the interpretation. When the Java bytecodes are structured around a pure stack machine implementation, the process of interpreting a set of non-optimal Java bytecode can be quite slow. It should therefore be apparent that a need exists for a method and system for optimizing Java bytecode before the bytecode interpretation process occurs within a computer system.

SUMMARY OF THE INVENTION

In view of the foregoing, it is therefore an object of the present invention to provide an improved method and system for data processing.

It is another object of the present invention to provide an improved method and system for processing non-native bytecodes.

It is yet another object of the present invention to provide an improved method and system for optimizing non-native bytecodes before bytecode interpretation within a computer system.

In accordance with the method and system of the present invention, a first bytecode and a second bytecode are obtained from a file. Both the first bytecode and the second bytecode result from a compilation of a high-level computer program. A set of instructions native to a processor within the computer system can be formed by compiling the first bytecode and the second bytecode. An optimizable bytecode table is provided, and the optimizable bytecode table includes multiple bytecode-pair entries and a corresponding optimized bytecode for each pair. A determination is made as to whether or not the first bytecode and the second bytecode are optimizable by comparing the first bytecode and the second bytecode with all of the bytecode-pair entries within the optimizable bytecode table. In response to a determination that the first bytecode and the second bytecode match one of the bytecode-pair entries within the optimizable bytecode table, the first bytecode and the second bytecode are replaced with a corresponding optimized bytecode from the optimizable bytecode table.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

The present invention may be executed in a variety of computers under a number of different operating systems. The computer may be, for example, a personal computer, a midrange computer or a mainframe computer. In addition, the computer may be a stand-alone system or part of a network such as a local-area network (LAN) or a wide-area network (WAN). For the purpose of illustration, a preferred embodiment of the present invention, as described below, is implemented on a personal computer, such as the Aptiva™ series manufactured by International Business Machines Corporation.

Figure 1:
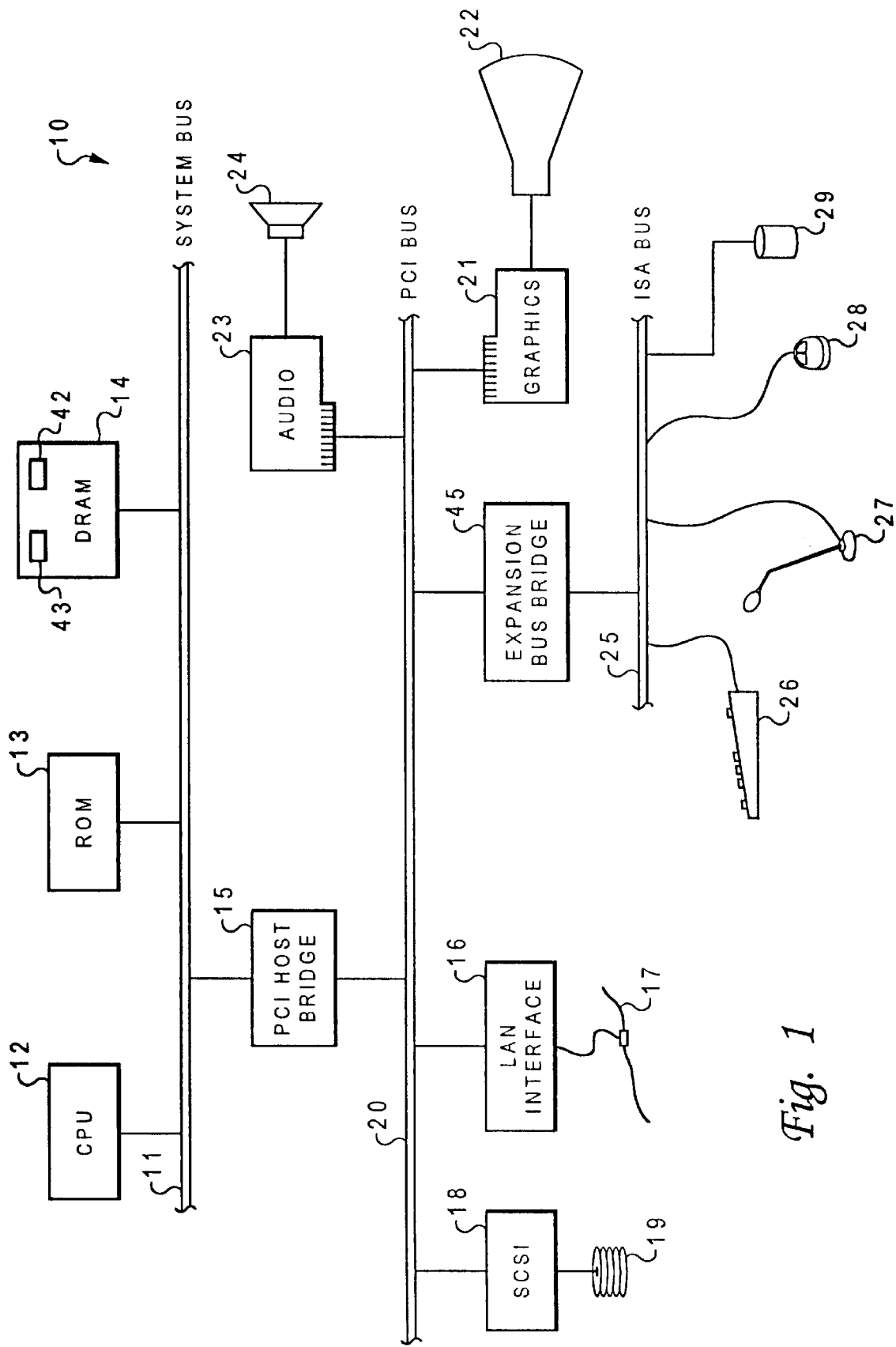
FIG. 1 is a block diagram of a typical computer system that may utilize a preferred embodiment of the present invention.

Referring now to the drawings and in particular to FIG. 1, there is depicted a block diagram of a typical computer system that may utilize a preferred embodiment of the present invention. As shown, a central processing unit (CPU) 12, a read-only memory (ROM) 13, and a Dynamic Random-Access Memory (DRAM) 14 are connected to a system bus 11 of a computer system 10. CPU 12, ROM 13, and DRAM 14 are also coupled to a PCI local bus 20 of computer system 10 through a PCI host bridge 15. PCI host bridge 15 provides a low latency path through which processor 12 may directly access PCI devices mapped anywhere within bus memory and/or I/O address spaces. PCI host bridge 15 also provides a high bandwidth path for allowing PCI devices to directly access DRAM 14.

Also attaching to PCI local bus 20 are LAN interface 16, small computer system interface (SCSI) 18, and expansion bus bridge 45. LAN interface 16 is for connecting computer system 10 to a local-area network 17. SCSI 18 is utilized to control high-speed SCSI disk drive 19. Expansion bus bridge 45, such as a PCI-to-ISA bus bridge, may be utilized for coupling ISA bus 25 to PCI local bus 20. As shown, a keyboard 26, a microphone 27, and a mouse 28 are attached to ISA bus 25 for performing certain basic I/O functions. In addition, an audio adapter 23 is attached to PCI local bus 20 for controlling audio output through speaker 24. A graphics adapter 21 is also attached to PCI local bus 20 for controlling visual output through display monitor 22.

Residing within DRAM 14 of computer system 10 are, inter alia, an interpreter 42 for translating non-native bytecodes to bytecodes that are native to CPU 12 and a program 43 for optimizing non-native bytecodes before bytecode interpretation in accordance with a preferred embodiment of the present invention. A non-native bytecode such as Java bytecode is an opcode having one byte value that represents an instruction of the Java virtual machine.

Figure 2:
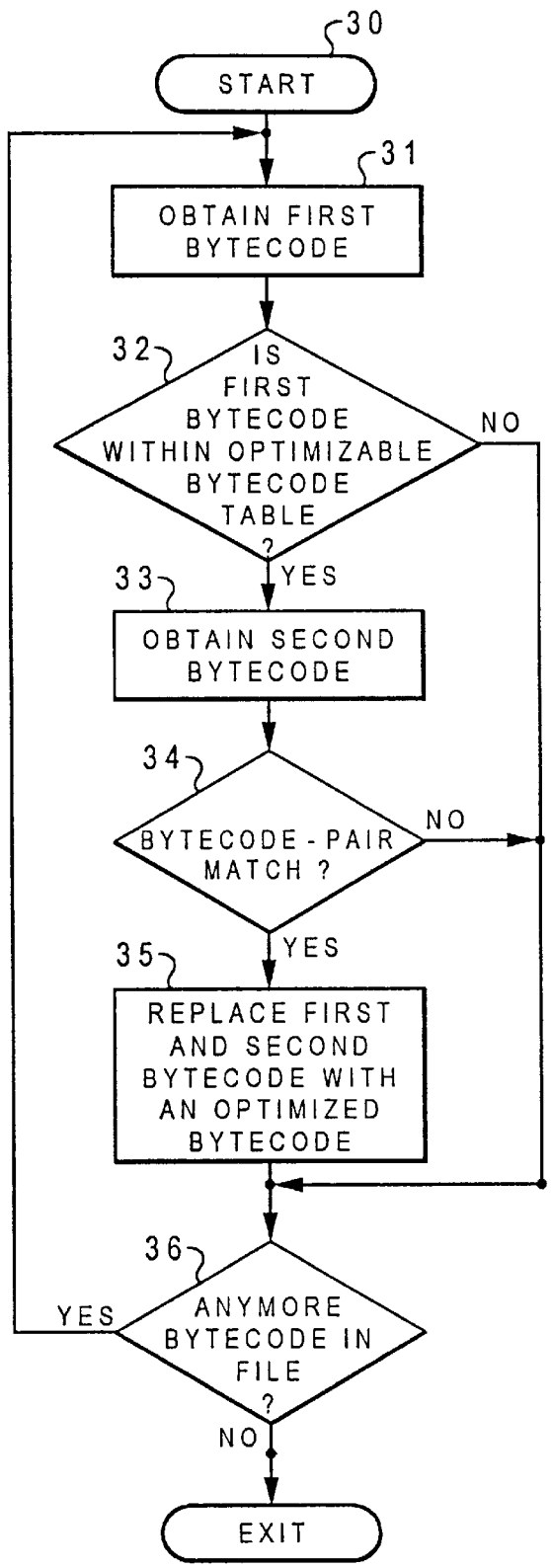
FIG. 2 is a high-level logic flow diagram of a method for optimizing Java bytecodes in accordance with a preferred embodiment of the present invention.

With reference now to FIG. 2, there is illustrated a high-level logic flow diagram of a method for optimizing Java bytecodes in accordance with a preferred embodiment of the present invention. Starting at block 30, a first bytecode is obtained from a file containing Java bytecode, as shown in block 31. A determination is then made as to whether or not the first bytecode is within an optimizable bytecode table, as depicted in block 32. If the first bytecode is not within the optimizable bytecode table, the process proceeds to block 36. Otherwise, if the first bytecode is within the optimizable bytecode table, a second bytecode is obtained from the Java bytecode file, as illustrated in block 33.

Subsequently, a determination is made as to whether or not the first bytecode and the second bytecode match a bytecode-pair within the optimizable bytecode table, as depicted in block 34. If the first bytecode and the second bytecode do not match with a bytecode-pair within the optimizable bytecode table, the process proceeds to block 36. However, if the first bytecode and the second bytecode match with a bytecode-pair within the optimizable bytecode table, the first bytecode and the second bytecode are replaced with an optimized bytecode that corresponds to the matched bytecode-pair within the optimizable bytecode table, as shown in block 35. Otherwise, if the first bytecode and the second bytecode do not match with a bytecode-pair within the optimizable bytecode table, a determination is made as to whether or not there is any more bytecode in the Java bytecode file, as depicted in block 36. If there is another bytecode within the Java bytecode file, the process returns back to block 31. However, if there is no more bytecode within the Java bytecode file, that means it is the end of the Java bytecode file, and the process exits at block 99.

TABLE I

| First Bytecode (value) | Second Bytecode (value) | Optimized Bytecode (value) |
| --- | --- | --- |
| aconst_null(1) | astore(58) | astore_null(210) |
| aconst_null(1) | astore_<n>(75::78) | astore_<n>_null(211+n) |
| iconst_m1(2) | istore(54) | istore_m1(215) |
| iconst_<n>(3::8) | istore(54) | iconststore_<n>(216+n) |
| iconst_<l>(9::10) | istore(55) | lconststore_<l> (237+Bytecode−9) |

TABLE I-continued

| First Bytecode (value) | Second Bytecode (value) | Optimized Bytecode (value) |
| --- | --- | --- |
| fconst_<f>(11::13) | fstore(56) | fconststore_<f> (239+Bytecode−11) |
| dconst_<d>(14::15) | dstore(57) | dconststore_<d> (242+Bytecode−14) |
| iload(21) | ifxx(153::158) | ifiloadxx (226+(153−nextBytecode)) |
| istore(54) | iload(21) | istoreload(232) |
| lstore(55) | lload(22) | lstoreload(233) |
| fstore(56) | fload(23) | fstoreload(234) |
| dstore(57) | dload(24) | dstoreload(235) |
| astore(58) | aload(25) | astoreload(236) |

As a preferred embodiment of the present invention, an optimizable bytecode table contains a list of bytecode-pairs that have been identified as optimizable. Currently identified optimizable bytecode-pairs are listed in Table I. As shown, the list of optimizable bytecode-pairs in Table I only serves as an example, and is not an exhaustive list. Table I comprises three columns. The first column contains a first bytecode. This first bytecode is utilized for the comparison step as shown in block 32 of FIG. 2. The second column contains a second bytecode to be utilized with an immediate preceding first bytecode to form a bytecode-pair. The third column yields an optimized bytecode for such bytecode-pair. An optimized bytecode is to be utilized for replacing both a first bytecode and a second bytecode in a Java bytecode file if the first bytecode and the second bytecode in the Java bytecode file match the corresponding bytecode-pair of the optimized bytecode. In Table I, while the values associated with each first bytecode and second bytecode are predefined, the values associated with each optimized bytecode are arbitrary, and any available bytecode not previously defined will do.

The following is a description of each optimized bytecode in the third column of Table I:

astore_null(vindex): This bytecode stores a null into the local variable denoted by vindex. This bytecode avoids first pushing the null onto the stack.

astore_<n>_null(vindex): This bytecode stores a null into the local variable denoted by n. This bytecode avoids first pushing the null onto the stack.

istore_m1(vindex): This bytecode stores a −1 into the local variable denoted by vindex. This bytecode avoids first pushing the −1 onto the stack.

iconststore_<n>(vindex): This bytecode stores the integer constant n into the local variable denoted by vindex. This bytecode avoids first pushing the n onto the stack.

lconststore_<n>(vindex): This bytecode stores the long integer constant n into the local variable denoted by vindex. This bytecode avoids first pushing the n onto the stack.

fconststore_<n>(vindex): This bytecode stores the double float constant n into the local variable denoted by vindex. This bytecode avoids first pushing the n onto the stack.

dconststore_<n>(vindex): This bytecode stores the double float constant n into the local variable denoted by vindex. This bytecode avoids first pushing the n onto the stack.

ifiloadxx(vindex, branchbyte1, branchbyte2): The local variable denoted by vindex is compared against 0 in the appropriate fashion. If the test succeeds, then the next instruction is obtained by adding (branchbyte1*256)+branchbyte2 to the current program counter. Otherwise execution continues with the next bytecode. The appropriate test is determined by the value of xx. The tests are equal, not equal, less than, greater than, less than or equal, and greater than or equal.

istoreload(vindex1, vindex2): The local integer variable denoted by vindex1 is replaced by the integer contents of the top of the stack. The integer contents of the top of the stack are then replaced by the local integer variable denoted by vindex2. This bytecode allows the optimization of several push and pops from the stack.

Istoreload(vindex1, vindex2): The local long integer variable denoted by vindex1 is replaced by the long integer contents of the top of the stack. The long integer contents of the top of the stack are then replaced by the local long integer variable denoted by vindex2. This bytecode allows the optimization of several push and pops from the stack.

fstoreload(vindex1, vindex2): The local single float variable denoted by vindex1 is replaced by the single float contents of the top of the stack. The single float contents of the top of the stack are then replaced by the local single float variable denoted by vindex2. This bytecode allows the optimization of several push and pops from the stack.

dstoreload(vindex1, vindex2): The local double float variable denoted by vindex1 is replaced by the double float contents of the top of the stack. The double float contents of the top of the stack are then replaced by the local double float variable denoted by vindex2. This bytecode allows the optimization of several push and pops from the stack.

astoreload(vindex1, vindex2): The local reference variable denoted by vindex1 is replaced by the reference contents of the top of the stack. The reference contents of the top of the stack are then replaced by the local reference variable denoted by vindex2. This bytecode allows the optimization of several push and pops from the stack.

As has been described, the present invention provides an improved method for optimizing Java bytecodes before bytecode interpretation within a computer system. Although the optimization process can be performed in parallel with the interpretation of the Java bytecode, it is best to perform the optimization process first and then store the results for the subsequent interpretation process. Moreover, even though the optimization of only two bytecodes is described in the present disclosure, it is understood by those who are skilled in the art that more than two bytecodes can be optimized at the same time by utilizing the same technique as discussed. Further, even though Java bytecode is utilized in the present disclosure for illustrating the invention, the same technique as described in also applicable to other types of bytecodes generated by a compilation of a high-level computer program.

It is also important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for optimizing bytecodes before bytecode interpretation within a computer system, wherein said method comprising the steps of:

obtaining a first bytecode and a second bytecode from a file, wherein said first bytecode and said second bytecode result from a compilation of a high-level computer program, wherein said second bytecode is immediately subsequent to said first bytecode within said file, wherein a set of instructions native to a processor within said computer system can be formed by interpreting said first bytecode and said second bytecode;

providing an optimizable bytecode table, wherein said optimizable bytecode table includes a plurality of bytecode-pair entries, wherein each of said plurality of bytecode-pair entries corresponds to an associated optimized bytecode;

determining whether or not said first bytecode and said second bytecode are optimizable by comparing said first bytecode and said second bytecode with said plurality of bytecode-pair entries within said optimizable bytecode table; and in response to a determination that said first bytecode and said second bytecode match one of said plurality of bytecode-pair entries within said optimizable bytecode table, replacing said first bytecode and said second bytecode with a corresponding associated optimized bytecode from said optimizable bytecode table.

2. The method according to claim 1, wherein said first bytecode and said second bytecode are Java bytecodes.

3. The method according to claim 1, wherein said optimized bytecode is a modified Java bytecode.

4. The method according to claim 1, wherein said method further includes a step of returning to said obtaining step in response to a determination that said first bytecode and said second bytecode do not match one of said plurality of bytecode-pair entries within said optimizable bytecode table.

5. A computer system capable of optimizing bytecodes before bytecode interpretation, said computer system comprising:

means for obtaining a first bytecode and a second bytecode from a file, wherein said first bytecode and said second bytecode result from a compilation of a high-level computer program, wherein said second bytecode is immediately subsequent to said first bytecode within said file, wherein a set of instructions native to a processor within said computer system can be formed by interpreting said first bytecode and said second bytecode;

an optimizable bytecode table, wherein said optimizable bytecode table includes a plurality of bytecode-pair entries, wherein each of said plurality of bytecode-pair entries corresponds to an associated optimized bytecode;

means for determining whether or not said first bytecode and said second bytecode are optimizable by comparing said first bytecode and said second bytecode with said plurality of bytecode-pair entries within said optimizable bytecode table; and means for replacing said first bytecode and said second bytecode with a corresponding associated optimized bytecode from said optimizable bytecode table, in response to a determination that said first bytecode and said second bytecode match one of said plurality of bytecode-pair entries within said optimizable bytecode table.

6. The computer system according to claim 5, wherein said first bytecode and said second bytecode are Java bytecodes.

7. The computer system according to claim 5, wherein said optimized bytecode is a modified Java bytecode.

8. A computer program product residing on a computer usable medium for optimizing bytecodes before bytecode interpretation within a computer system, said computer product comprising:

program code means for obtaining a first bytecode and a second bytecode from a file, wherein said first bytecode and said second bytecode result from a compilation of a high-level computer program, wherein said second bytecode is immediately subsequent to said first bytecode within said file, wherein a set of instructions native to a processor within said computer system can be formed by interpreting said first bytecode and said second bytecode;

an optimizable bytecode table, wherein said optimizable bytecode table includes a plurality of bytecode-pair entries, wherein each of said plurality of bytecode-pair entries corresponds to an associated optimized bytecode;

program code means for determining whether or not said first bytecode and said second bytecode are optimizable by comparing said first bytecode and said second bytecode with said plurality of bytecode-pair entries within said optimizable bytecode table; and program code means for replacing said first bytecode and said second bytecode with a corresponding associated optimized bytecode from said optimizable bytecode table, in response to a determination that said first bytecode and said second bytecode match one of said plurality of bytecode-pair entries within said optimizable bytecode table.

9. The computer program product according to claim 8, wherein said first bytecode and said second bytecode are Java bytecodes.

10. The computer program product according to claim 8, wherein said optimized bytecode is a modified Java bytecode.

11. The computer program product according to claim 8, wherein said computer system further includes a program code means for returning to said program code means for obtaining a first bytecode and a second bytecode from said file, in response to a determination that said first bytecode and said second bytecode do not match one of said plurality of bytecode-pair entries within said optimizable bytecode table.

\* \* \* \* \*